United States Patent

Yamaki et al.

[11] Patent Number: 6,120,006
[45] Date of Patent: Sep. 19, 2000

[54] VALVE DEVICE

[75] Inventors: Seiji Yamaki; Ryuji Shinozaki; Kenichi Kawazoe, all of Tokyo, Japan

[73] Assignee: Yamatake Corporation, Tokyo, Japan

[21] Appl. No.: 09/172,912

[22] Filed: Oct. 15, 1998

[30] Foreign Application Priority Data

Oct. 22, 1997 [JP] Japan .................................. 9-290169

[51] Int. Cl.⁷ .............................. F16K 41/04; F16J 15/24
[52] U.S. Cl. .......................... 251/214; 277/522; 277/523
[58] Field of Search ............................ 251/214; 277/522, 277/523

[56] References Cited

U.S. PATENT DOCUMENTS

| | | | |
|---|---|---|---|
| 3,322,149 | 5/1967 | Haenky | 251/214 |
| 5,195,756 | 3/1993 | Wachter | 251/214 |
| 5,326,074 | 7/1994 | Spock, Jr. et al. | 251/214 |
| 5,456,447 | 10/1995 | Reynolds | 251/214 |
| 5,503,406 | 4/1996 | Armstrong et al. | 277/522 |

*Primary Examiner*—George L. Walton
*Attorney, Agent, or Firm*—Rothwell, Figg, Ernst & Manbeck

[57] ABSTRACT

A valve device includes a valve stem 2 vertically movably inserted in a packing box 1a; a gland packing 6 interposed between the packing box 1a and the valve stem 2; a packing follower 15 disposed on the gland packing 6; and one or more arched plate springs 19 for pressing the gland packing 6 via the packing follower 15 or a packing flange 7 disposed on the packing follower 15.

7 Claims, 8 Drawing Sheets

VALVE DEVICE

BACKGROUND OF THE INVENTION

1. Field of the Invention

The present invention relates to a valve device suitably used for general valves, such as a globe valve, a gate valve and a butterfly valve, incorporated in pipelines laid in factories, plants and the like.

2. Description of the Prior Art

Factories or plants have a large number of pipelines allowing fluids having very high internal pressures to flow therethrough unlike general air-conditioning equipment. A valve device for controlling a flow passage allowing a fluid having such a very high internal pressure to flow therethrough must be rendered air-tight enough to prevent the fluid from leaking to the exterior of the valve device.

FIG. 12 is a view showing a prior art valve device disclosed, for example in Japanese Utility Model Publication No. Hei 1-24465. In the figure, reference numeral 1 denotes an upper lid; 1a is a packing box constituting an upper half of the upper lid 1; 2 is a valve stem vertically movably inserted in the packing box 1a; 6 is a gland packing interposed between the packing box 1a and the valve stem 2; 7 is a packing flange disposed on the upper surface of the gland packing 6; and 11 is a coil spring disposed under the gland packing 6 in the packing box 1a in such a manner as to be held between coil spring seats 12a and 12b.

The operation of the above valve device will be described below.

In the structure of such a coil spring type, the gland packing 6 is pressed to the packing flange 7 by means of the repulsive force of the coil spring 11, to thereby keep the neighborhood of the valve stem airtight.

FIG. 13 is a view showing another prior art valve device disclosed in the above document, Japanese Utility Model Publication No. Hei 1-24465. In the figure, reference numeral 13 denotes a tap bolt screwed in the upper lid 1 via a through-hole formed in the packing flange 7; and 14 is a conical disc spring interposed between the packing flange 7 and the head of the tap bolt 13. It should be noted that the same or similar parts as or to those shown in FIG. 12 are denoted by the same reference numerals and the explanation thereof is omitted.

The operation of the above valve device will be described below.

In the structure of such a conical disc spring type, the conical disc springs 14 and the packing flange 7 are fastened by means of the tap bolts 13, so that the gland packing 6 is pressed by the packing flange 7 to thereby keep the neighborhood of the valve stem airtight.

The prior art valve devices having the above configurations have problems. That is to say, the prior art coil spring type valve device entails the problem that a fluid having a high internal pressure leaks to the exterior of the valve device because the repulsive force of the coil spring 11 to the gland packing 6 is small and thereby the force of the gland packing 6, applied to press the packing flange 7, is insufficient.

Meanwhile, the prior art valve device of the conical disc type entails the problem that it is difficult to keep up with a secular change in pressing force of the gland packing 6 itself because the repulsive force of the conical disc spring 14 to the packing flange 7 is sufficiently large but the displacement of the conical disc spring 14 in the pressing direction is small.

The conical disc type, in which the packing flange 7 is disposed under the tap bolts 13 via the springs, also entails the problem that it is difficult to fasten the packing flange 7 because as the tap bolts 13 are screwed, there tends to be two fulcrums with the result that the packing flange 7 tends to be tilted.

In the prior art valve devices having the above structures, since all of the tap bolts 13 must be removed to add a new spring to increase the spring force after assembly of the gland packing, there arises a problem that it takes a lot of labor to add such a new spring.

In the prior art valve devices having the above structures, since a large-sized coil spring or a large number of conical disc springs must be provided to prevent leakage of a fluid, it is difficult to reduce the weight of the valve device and thereby the pipeline must bear an increased load, with a result that there arises a problem that it is difficult to keep the air-tightness of the pipeline for a long period of time.

SUMMARY OF THE INVENTION

The present invention has been made to solve the above-described problems, and an object of the present invention is to provide a valve device capable of applying a high pressing force to a gland packing for a long period of time.

Another object of the present invention is to provide a valve device capable of easily increasing a spring force after assembly of a gland packing.

A further object of the present invention is to provide a valve device capable of suppressing the tilting of a packing retaining means caused by fastening a gland packing.

Still a further object of the present invention is to provide a valve device capable of reducing the weight of the valve device.

According to the first aspect of the present invention, there is provided a valve device including: a valve stem vertically movably inserted in packing containing means; a gland packing interposed between the packing containing means and the valve stem; packing retaining means disposed on the gland packing; an arched plate springs each having a valve stem through-hole and a plurality of bolt through-holes; and a plurality of bolt members for pressing the gland packing via the plate springs disposed on the packing retaining means.

With this first aspect, the valve device includes a valve stem vertically movably inserted in packing containing means; a gland packing interposed between the packing containing means and the valve stem; packing retaining means disposed on the gland packing; arched plate springs each having a valve stem through-hole and a plurality of bolt through-holes; and a plurality of bolt members for pressing the gland packing via the plate springs disposed on the packing retaining means. Accordingly, the gland packing can be fastened by a high spring pressure applied from the arched plate springs. Hence the pressing force applied to the gland packing can be maintained for a long period of time. Further, with this aspect, since the fastening stress applied to the arched plate springs is concentrated near the valve stem through-hole, the tilting of the packing retaining means can be suppressed and fastening can be easily carried out.

According to the second aspect of the present invention, there is provided a valve device including: a valve stem vertically movably inserted in packing containing means; a gland packing interposed between the packing containing means and the valve stem; a packing flange disposed on the gland packing via packing retaining means; an arched plate spring having a valve stem through-hole and a plurality of bolt through-holes; and a plurality of bolt members for pressing the gland packing via the plate springs disposed at least on the upper surface or the lower surface of the packing flange.

With this second aspect, the valve device includes a valve stem vertically movably inserted in packing containing means; a gland packing interposed between the packing containing means and the valve stem; a packing flange disposed on the gland packing via packing retaining means; one or more arched plate springs each having a valve stem through-hole and a plurality of bolt through-holes; and a plurality of bolt members for pressing the gland packing via the plate springs disposed at least on the upper surface or the lower surface of the packing flange. Accordingly, the gland packing can be fastened by a high spring force applied from the one or more arched plate springs to the gland packing via the packing flange. Hence the pressing force applied to the gland packing can be maintained for a long period of time. Further, with this aspect, the provision of the arched plate springs with a fastening stress concentrated near the valve stem through-hole and packing flange not deflected sideways when the bolt members are screwed means that the tilting of the packing retaining means can be suppressed.

According to a third aspect of the present invention, in addition to the configuration of the first aspect, the plate springs have cutout grooves which engage with a portion of the bolt member, in place of the bolt through-holes. The valve stem through-hole has a circular hole shape or groove shape.

With the third aspect, the plate springs have cutout grooves engaged with a portion of the bolt member, in place of the bolt through-holes, and the valve stem through-hole has a circular hole shape or groove shape. Accordingly, the weight of the plate springs can be reduced.

According to a fourth aspect of the present invention, the plate springs have cutout grooves engaged with a portion of the bolt member, in place of the bolt through-holes, and the valve stem through-hole has a groove shape, the groove being opened in the same direction as the direction in which the cutout grooves are opened.

With the fourth aspect, the plate springs have cutout grooves engaged with a portion of the bolt member, in place of the bolt through-holes, and the valve stem through-hole has a groove shape, the groove being opened in the same direction as the direction in which the cutout grooves are opened Accordingly, the weight of the plate springs can be reduced. Further, with this aspect, since a new plate spring can be additionally stacked by only loosening the bolt members without removing the bolt members, the spring force can be easily increased after assembly of the gland packing.

According to a fifth aspect of the present invention, the plate springs are fixed with both end portions thereof engaged with portions of the bolt members.

With the fifth aspect, the plate springs are fixed with both end portions thereof engaged with portions of the bolt members, and accordingly, there can be obtained an effect of reducing the size and weight of the one or more plate springs.

According to a sixth aspect of the present invention, the plate springs are bent in such a manner that the portions having the bolt through-holes are flattened.

With the sixth aspect, the plate springs are bent in such a manner that the portions having the bolt through-holes are flattened. Accordingly, the inconvenience can be avoided that the bolt members are brought in contact with the end portions of the plate springs when the bolt members are screwed in and thereby the bolt members cannot be easily screwed in.

According to a seventh aspect of the present invention, the plate springs have a guide portion to be fitted in the valve stem through-hole of the packing retaining means, the guide portion being provided around the valve stem through-hole of the one or more plate springs. Alternatively the packing retaining means has a guide portion to be fitted in the valve stem through-hole of the one or more plate springs, the guide portion being provided around the valve stem through-hole of the packing retaining means.

With the seventh aspect, the plate springs have a guide portion to be fitted in the valve stem through-hole of the packing retaining means, the guide portion being provided around the valve stem through-hole of the one or more plate springs. Alternatively the packing retaining means has a guide portion to be fitted in the valve stem through-hole of the one or more plate springs, the guide portion being provided around the valve stem through-hole of the packing retaining means. Accordingly, the inconvenience that when the bolt members are tightened, the plate springs are offset and brought in contact with the valve stem and so obstruct the movement of the valve stem can be avoided.

According to an eighth aspect of the present invention, the plate springs have cutout grooves engaged with a portion of the bolt member, in place of the bolt through-holes, and the valve stem through-hole has a circular hole shape or groove shape.

With the eighth aspect, the plate springs have cutout grooves engaged with a portion of the bolt member, in place of the bolt through-holes, and the valve stem through-hole has a circular hole shape or groove shape. Accordingly, the weight of the plate springs can be reduced.

According to a ninth aspect of the present invention, the plate springs have cutout grooves engaged with a portion of the bolt member, in place of the bolt through-holes, and the valve stem through-hole has a groove shape, the groove being opened in the same direction as the direction in which the cutout grooves are opened.

With the ninth aspect, the plate springs have cutout grooves engaged with a portion of the bolt member, in place of the bolt through-holes, and the valve stem through-hole has a groove shape, the groove being opened in the same direction as the direction in which the cutout grooves are opened. Accordingly, the weight of the plate springs can be reduced. Further, with this aspect, since a new plate spring can be additionally stacked by only loosening the nut members without removing the bolt members, the spring force can be easily increased after assembly of the gland packing.

According to a tenth aspect of the present invention, the plate springs are fixed with both end portions thereof engaged with portions of the bolt members.

With the tenth aspect, the plate springs are fixed with both end portions thereof engaged with portions of the bolt members, and accordingly the size and weight of the one or more plate springs can be reduced.

According to an eleventh aspect of the present invention the plate springs are bent in such a manner that the portions having the bolt through-holes are flattened.

With the eleventh aspect, the plate springs are bent in such a manner that the portions having the bolt through-holes are flattened. Accordingly, the inconvenience that the bolt members are brought in contact with end portions of the plate springs when the bolt members are screwed and thereby the bolt members cannot be easily screwed can be avoided.

According to a twelfth aspect of the present invention, the plate springs have a guide portion to be fitted in the valve stem through-hole of the packing retaining means, the guide portion being provided around the valve stem through-hole of the plate springs. Alternately the packing retaining means has a guide portion to be fitted in the valve stem through-hole of the plate springs, the guide portion being provided around the valve stem through-hole of the packing retaining means.

With the twelfth aspect, the plate springs have a guide portion to be fitted in the valve stem through-hole of the packing retaining means, the guide portion being provided around the valve stem through-hole of the plate springs Alternately the packing retaining means has a guide portion to be fitted in the valve stem through-hole of the one or more plate springs, the guide portion being provided around the valve stem through-hole of the packing retaining means Accordingly, the inconvenience that when the bolt members are tightened, the plate springs are offset and brought in contact with the valve stem and so obstruct the movement of the valve stem can be avoided.

BRIEF DESCRIPTION OF THE DRAWINGS

FIGS. 11a and 11b are views schematically showing a valve device according to a third embodiment of the present invention, wherein FIG. 11a is a sectional side view of the valve device and FIG. 11b is a top view of the valve device;

DETAILED DESCRIPTION OF THE PREFERRED EMBODIMENTS

Hereinafter, preferred embodiments of the present invention will be described with reference to the accompanying drawings.

Embodiment 1

Figure 1:
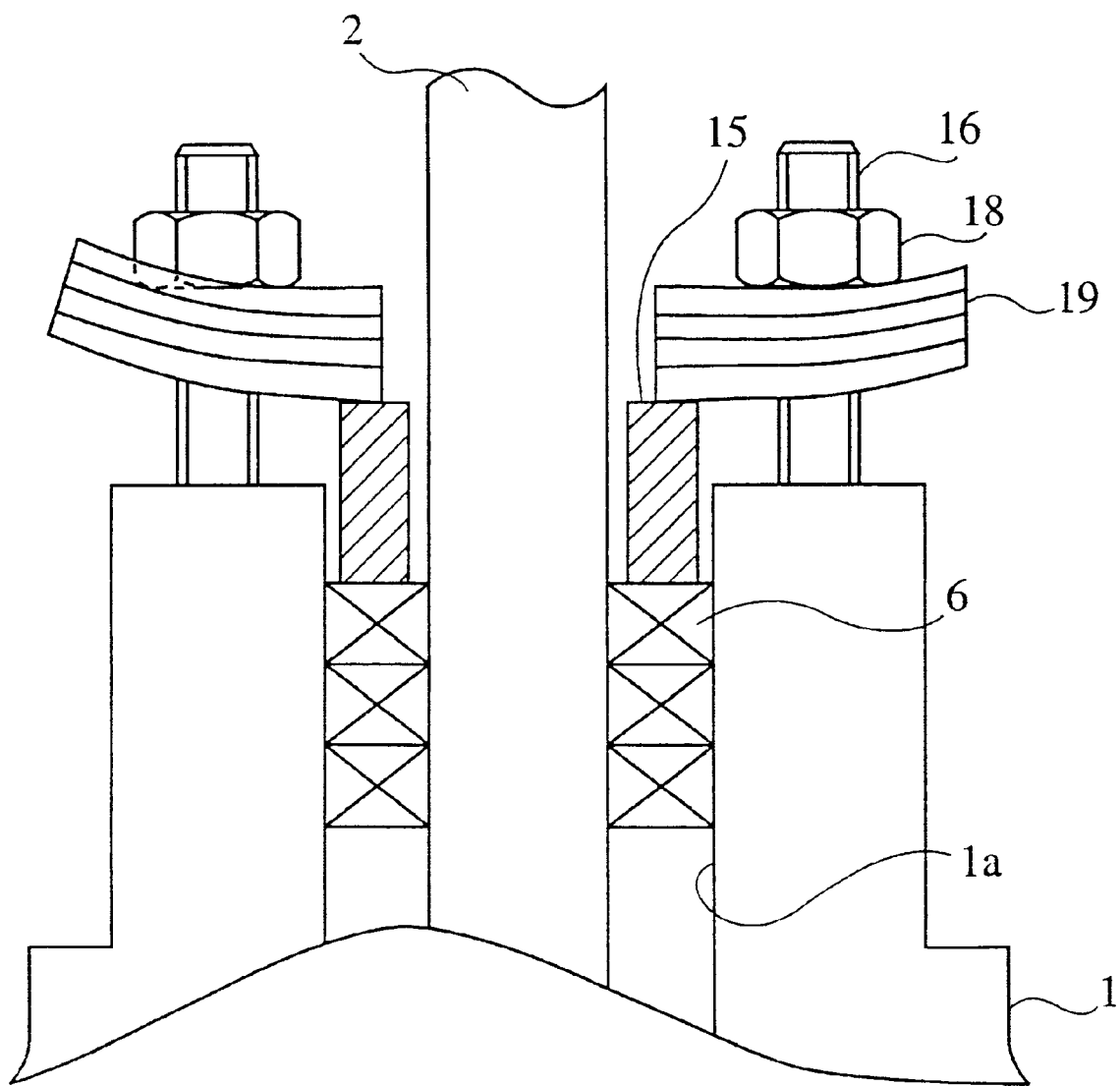
FIG. 1 is a vertical sectional view showing a valve device according to a first embodiment of the present invention.

FIG. 1 is a view showing a valve device according to a first embodiment of the present invention. In the figure, reference numeral 1 denotes an upper lid; 1a is a packing box (packing containing means) constituting the upper half of the upper lid 1; 2 is a valve stem vertically movably inserted in the packing box 1a; 6 is a gland packing interposed between the packing box 1a and the valve stem 2; 15 is a packing follower (packing retaining means), disposed on the gland packing 6, for retaining the gland packing 6; 16 is a pair of stud bolts (bolt member) screwed in a threaded hole formed in the upper portion of the upper lid 1 via a through-hole formed in one or more plate springs 19; 18 is a hexagonal head nut (bolt member) screwed around the upper end portion of the stud bolt 16; and 19 is one or more plate springs, each being formed into an arched shape viewed side-on, which are interposed between the packing follower 15 and the hexagonal head nuts 18.

The operation of the valve device will be described below.

The valve device having the above structure is assembled in accordance with the steps of allowing the valve stem 2 to pass through a hole or a cutout groove penetrating both the gland packing 6 and the packing follower 15; screwing threaded portions formed at the leading ends of the stud bolts 16 in the threaded holes formed in the upper portion of the upper lid 1; stacking a required number of the plate springs 19, and disposing the stacked plate springs 19 on the packing follower 15 in such a manner that the valve stem 2 and the stud bolts 16 pass through holes formed in the plate springs 19; and fastening the plate springs 19 from the upper side of the plate springs 19 by turning the hexagonal head nuts 18.

In this structure, since the arched plate springs 19 placed on the packing follower 15 are fastened from the upper side of the plate springs 19 by turning the hexagonal head springs 18 as described above, the spring pressure of the plate springs 19 is transmitted to the gland packing 6 via the packing follower 15, to thereby forcibly press the gland packing 6. Also since the plate springs 19 are arched, even when the plate springs 19 are fastened by turning a plurality of the hexagonal head nuts 18, the fastening stress is applied to a portion near the valve stem 2, with a result that the packing follower 15 is less tilted.

Figure 2:
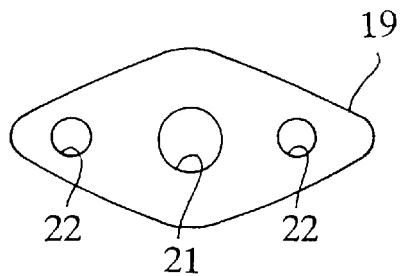
FIG. 2 is a plan view schematically showing two kinds of shapes of a plate spring.
Figure 2:
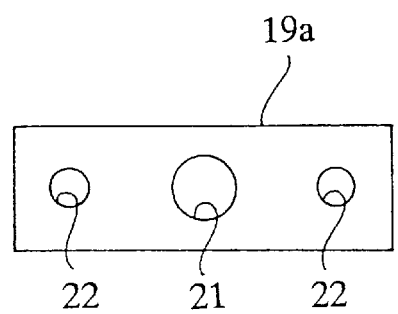

As represented by a plate spring 19a shown in FIG. 2, the plate spring 19 may be generally formed into an approximately circular shape or a rectangular shape in a plan view, and may have a valve stem through-hole 21 for allowing the valve stem 2 to pass therethrough and bolt through-holes 22 each allowing the stud bolt 16 to pass therethrough.

Figure 3:
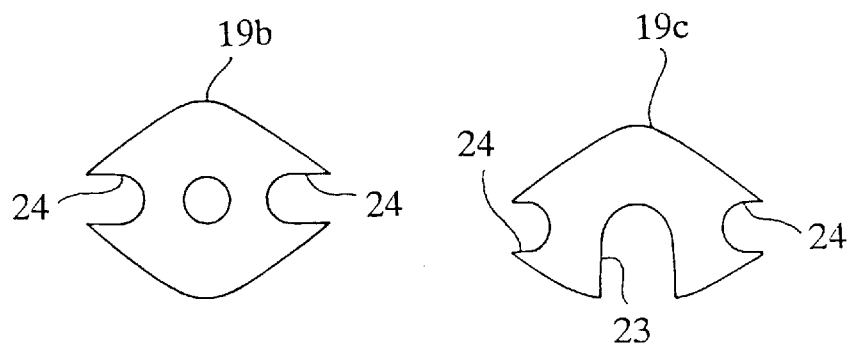
FIG. 3 is a plan view showing a plate spring having cutout grooves in place of bolt through-holes and a valve stem through-hole formed into a circular hole shape or a groove shape.
Figure 3:
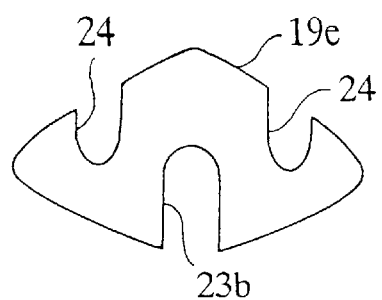

To reduce the weight of the plate spring 19, as represented by plate springs 19b, 19c and 19e shown in FIG. 3, the plate spring 19 may have cutout grooves 24 each allowing the stud bolt to pass therethrough.

Figure 4:
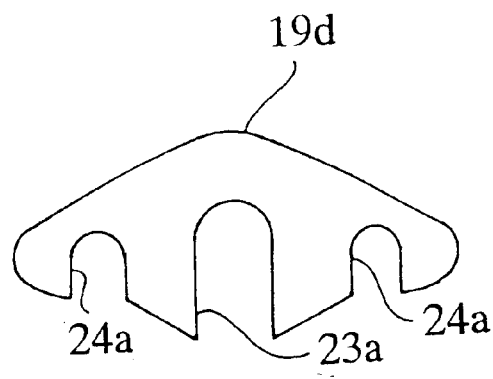
FIG. 4 is a plan view showing a plate spring having cutout grooves in place of bolt through-holes and a valve stem through-hole formed into a groove shape, the groove being opened in the same direction as the direction in which the cutout grooves are opened.

To add a new spring to increase the spring force after assembly of the gland packing, as represented by a plate spring 19d shown in FIG. 4, the plate spring 19 may have a cutout groove (valve stem through-hole) 23a for the valve stem 2 and cutout grooves 24a and 24b for the stud bolts 16, wherein the cutout groove 23a and the cutout grooves 24a and 24b are opened in the same direction. With this configuration, a new plate spring can be additionally stacked by only loosening the stud bolts 16 without removing the valve stem 2 and the stud bolts 16.

Figure 5:
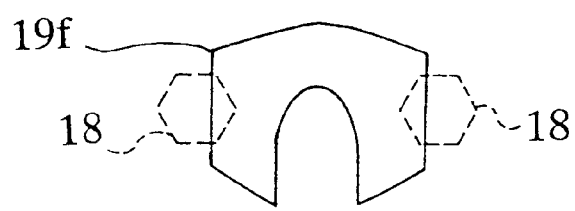
FIG. 5 is a plan view showing a plate spring fixed with its both end portions engaged with portions of bolt members.

To further reduce the size and weight of the plate spring 19, as represented by a plate spring 19f shown in FIG. 5, the plate spring 19 may be formed into a shape capable of being fixed with its both ends engaged with portions of the hexagonal head nuts 18.

Figure 6:
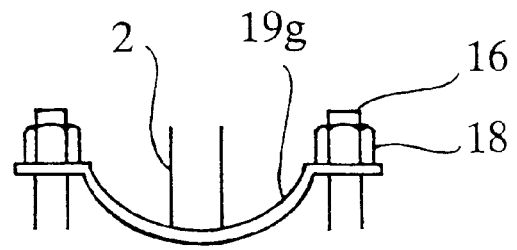
FIG. 6 is a side view schematically showing plate springs bent in such a manner that portions, having through-holes each allowing a stud bolt to pass therethrough, of the plate springs are flattened.

Each of the above-described various kinds of the plate springs has a possibility that when the hexagonal head nut 18 is screwed in, a portion of the bottom surface of the hexagonal head nut 18 is brought in contact with the end portion of the plate spring, to thereby obstruct the screwing of the hexagonal head nut 18. To cope with such an inconvenience, as represented by a plate spring 19g shown in FIG. 6, the plate spring may be bent in such a manner that portions, having the through-holes each allowing the stud bolt 16 to pass therethrough, of the plate spring are flattened.

Figure 7:
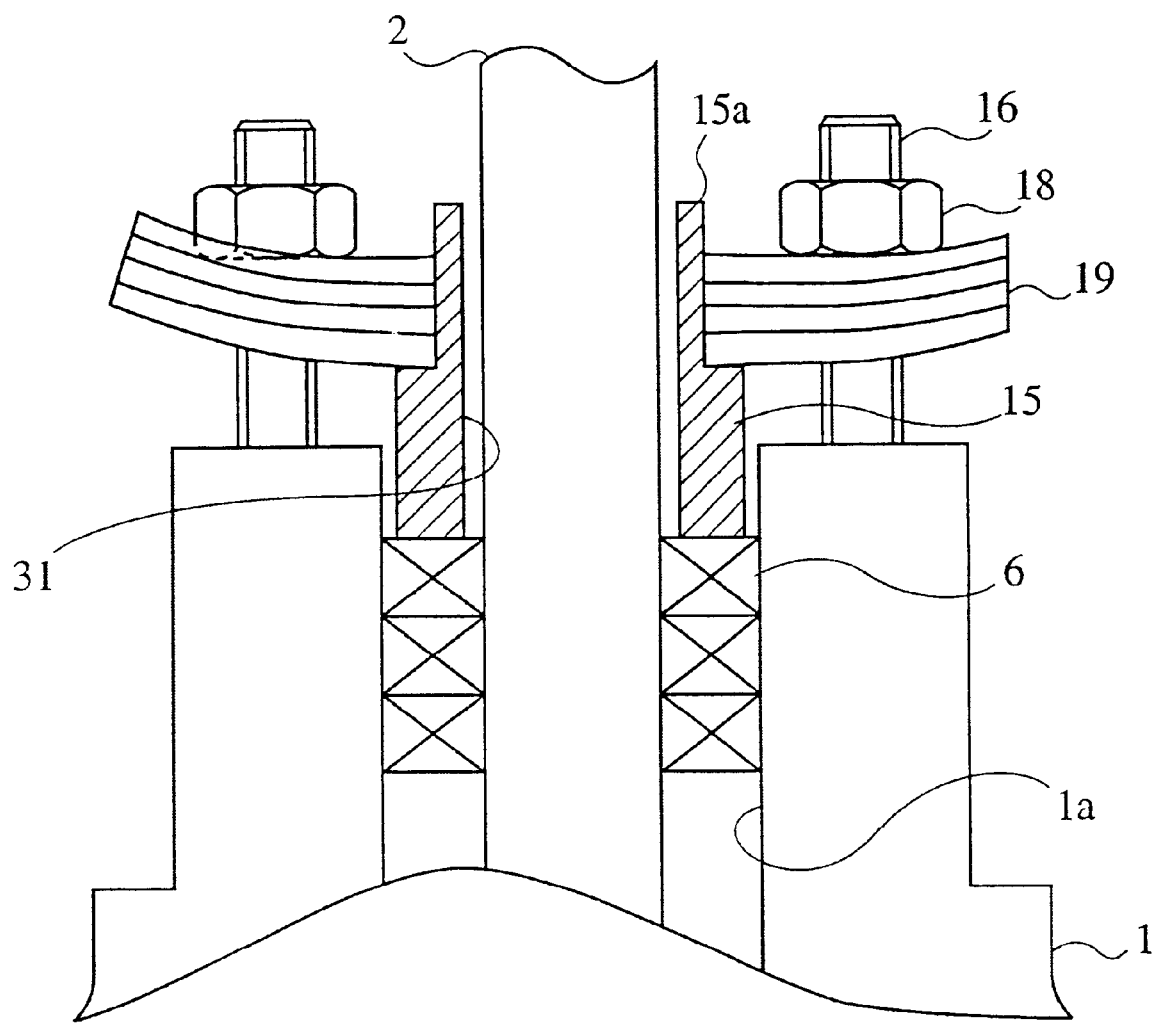
FIG. 7 is a sectional side view schematically showing a valve device in which a guide portion provided on packing retaining means is fitted in a valve stem through-hole of one or more plate springs.

To prevent such an inconvenience that when the hexagonal head nuts 18 are screwed, the plate springs 19 are offset and brought in contact with the valve stem 2 and obstruct the movement of the valve stem 2, as shown in FIG. 7, the packing follower 15 may have a guide portion 15a to be fitted in the valve stem through-hole of the plate springs 19, the guide portion 15a being disposed around a valve stem through-hole 31 of the packing follower 15; or the plate springs 19 may have a guide portion (not shown) to be fitted in the valve stem through-hole 31 of the packing follower 15, the guide portion being disposed around the valve stem through-hole of the plate springs 19.

As described above, according to the first embodiment, since the arched plate springs 19 placed on the packing follower 15 are fastened from the upper side of the plate springs 19 by turning the hexagonal head nuts 18, the gland packing 6 can be forcibly fastened via the packing follower 15 with the spring pressure of the plate springs 19.

According to the first embodiment, since the plate springs 19 are arched, even when the plate springs 19 are fastened by turning a plurality of hexagonal head nuts 18, the fastening stress is applied to a portion near the valve stem 2. As a result, the tilting of the packing follower 15 can be suppressed.

According to the first embodiment, by replacing the through-holes each allowing the stud bolt 16 to pass therethrough with the cutout grooves 24 as represented by the plate springs 19b, 19c and 19e, the weight of the plate spring can be reduced.

According to the first embodiment, by forming the cutout groove for the valve stem 2 and the cutout grooves for the stud bolts 16 in such a manner that the former cutout groove and the latter cutout grooves are opened in the same direction as represented by the plate spring 19d, the plate spring 19d can be additionally stacked by only loosening the nut 16 without removing the nut 18. As a result, the spring force can be easily increased after assembly of the gland packing, thereby keeping up with a secular change in pressing force of the gland packing 6 itself.

According to the first embodiment, by forming the plate spring into a shape capable of being fixed with its both the ends engaged with portions of the hexagonal head nuts 18 as represented by the plate spring 19f, there can be obtained an effect of reducing the size and weight of the plate spring.

According to the first embodiment, by bending the plate spring in such a manner that portions, having through-holes each allowing the stud bolt to pass therethrough, of the plate spring are flattened as represented by the plate spring 19g, the situation can be avoided that when the hexagonal head nut 18 is screwed, the bottom surface portion of the hexagonal head nut 18 is brought in contact with the end portion of the plate spring 19g and so obstructs the easy screwing of the hexagonal head nut 18.

According to the first embodiment, the guide portion 15a is provided on the packing follower 15 at a position around the valve stem through-hole thereof in such a manner that the guide portion 15a is fitted in the valve stem through-hole of the plate springs 19. Alternatively the guide portion is provided on the plate springs 19 at a position around the valve stem through-hole thereof in such a manner that the guide portion is fitted in the valve stem through-hole of the packing follower 15. The situation can be avoided when the hexagonal head nuts 18 are screwed, the plate springs 19 are offset and brought in contact with the valve stem 2 and so obstruct the movement of the valve stem 2.

Embodiment 2

Figure 8:
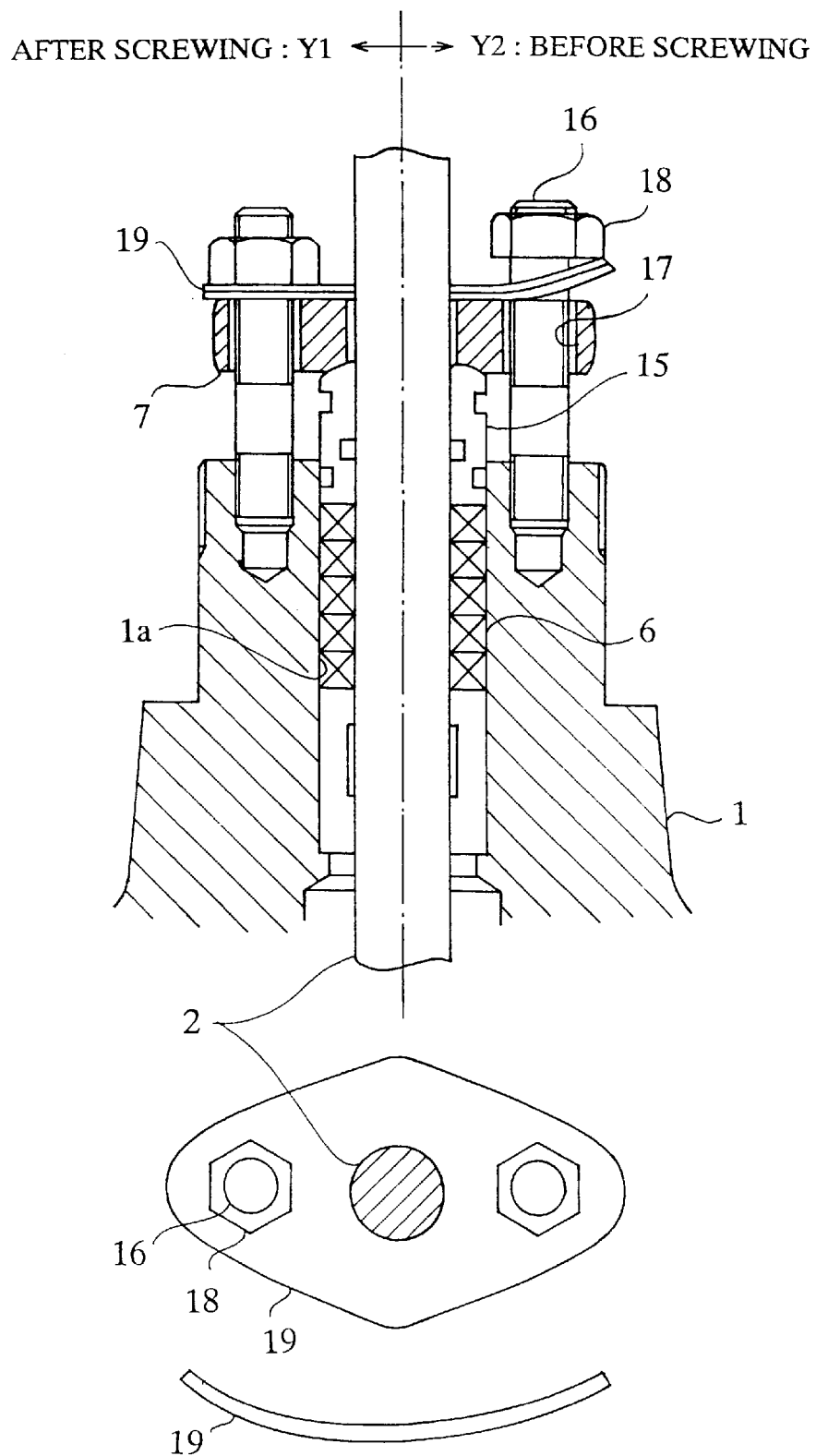
FIG. 8 shows views of a valve device according to a second embodiment of the present invention, wherein the vertical sectional view of the valve device is shown on the upper side; the top view of the valve device is shown at the central portion; and the side view of a plate spring used for the valve device is shown on the lower side.

FIG. 8 is a view showing a valve device according to a second embodiment of the present invention. In the figure, reference numeral 7 denotes a packing flange disposed on the upper surface of the gland packing 6 via the packing follower (packing retaining means) 15. The state after screwing the hexagonal head nuts 18 is shown on the side shown by an arrow Y1, and the state before screwing the hexagonal head nuts 18 is shown on the side shown by an arrow Y2. As shown in FIG. 8, the valve device according to the second embodiment is different from that according to the first embodiment in that the packing flange 7 is interposed between the one or more plate springs 19 and the packing follower 15. It should be noted that the same or similar parts as or to those shown in FIG. 1 are denoted by the same reference numerals and the explanation thereof is omitted.

The valve device according to the second embodiment is assembled in the following procedure:

(1) The gland packing 6 and the packing follower 15 are set in such a manner that the valve stem 2 passes through the holes formed in the gland packing 6 and the packing follower 15.

(2) The threaded portions formed at the leading ends of the stud bolts 16 are screwed in the threaded holes formed in the upper portion of the upper lid 1.

(3) The packing flange 7 and the plate springs 19 are set in such a manner that the valve stem 2 and the stud bolts 16 pass through the through-holes formed in the packing flange 7 and the plate springs 19.

(4) The gland packing 6 is fastened via the plate springs 19, packing flange 7 and packing follower 15 by turning the hexagonal head nuts 18.

It should be noted that the above assembling order from (1) to (2) may be reversed.

The packing flange 7 is not deflected sideways when the stud bolts 16 are screwed. Accordingly, as compared with the first embodiment in which the packing follower 15 is directly pressed by the plate springs 19, the tilting of the packing follower 15 caused by the fastening stress of the plate springs 19 can be more certainly suppressed.

Figure 9:
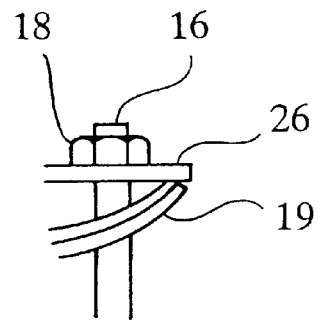
FIG. 9 is a side view schematically showing the valve device according to the second embodiment, in which a plate is interposed between hexagonal head nuts and one or more plate springs.

As shown in FIG. 9, a flat plate 26 may be interposed between the plate springs 19 and the hexagonal head nuts 18 in place of the packing flange 7. With this configuration, it is possible to reduce the weight of the valve device and to suppress the tilting of the packing follower 15 caused by the fastening stress of the plate springs 19. Also it is possible to prevent occurrence of the inconvenience that when the hexagonal head nut 18 is screwed in, a portion of the bottom surface of the hexagonal head nut 18 is brought in contact with the end portion of the plate springs 19 and so obstructs the easy screwing of the hexagonal head nut 18.

As represented by the plate spring 19a shown in FIG. 2, the plate spring used in the second embodiment may be formed into an approximately circular shape or a rectangular shape in a plan view, and may have a valve stem through-hole 21 for allowing the valve stem 2 to pass therethrough and bolt through-holes 22 allowing the stud bolts 16 to pass therethrough. To reduce the weight of the plate spring 19, as represented by the plate springs 19b, 19c and 19e shown in FIG. 3, the plate spring 19 may have cutout grooves 24 each allowing the stud bolt to pass therethrough; or as represented by the plate spring 19f shown in FIG. 5, the plate spring 19 may be formed into a shape capable of being fixed with its both ends engaged with portions of the hexagonal head nuts 18.

In order to add a new spring to increase the spring force after assembly of the gland packing, as represented by a plate spring 19d shown in FIG. 4, the plate spring used in the second embodiment may have a cutout groove (valve stem through-hole) 23a for the valve stem 2 and cutout grooves 24a and 24b for the stud bolts 16, wherein the cutout groove 23a and the cutout grooves 24a and 24b are opened in the same direction. With this configuration, a new plate spring can be additionally stacked by only loosening the nut 18 without removing the valve stem 2 and the nut 18.

Figure 10:
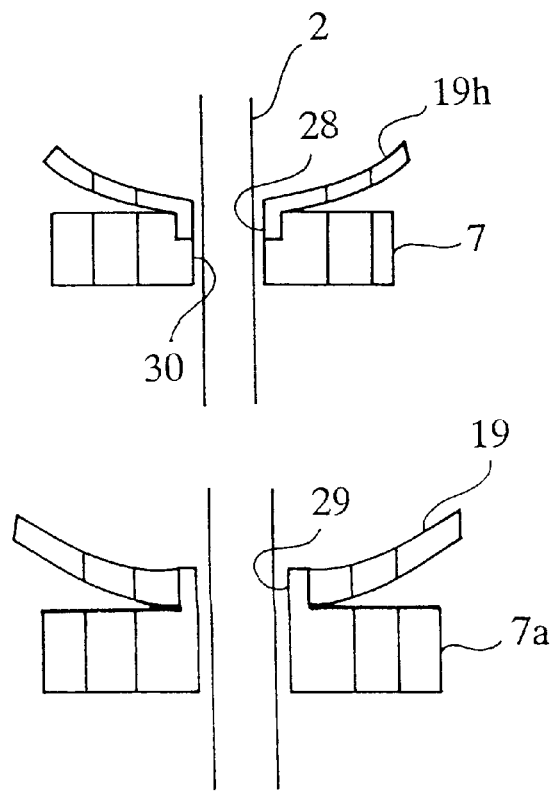
FIG. 10 is a vertical sectional view showing one or more plate springs having a guide and a packing flange having a guide, which are both used for the valve device according to the second embodiment.

To prevent such an inconvenience that when the hexagonal head nuts 18 are screwed in, the plate springs 19 are offset and brought in contact with the valve stem 2 to obstruct the movement of the valve stem 2, as shown in FIG. 10, a guide portion 28 to be fitted in a valve stem through-hole 30 of the packing flange 7 may be provided on plate springs 19h at a position around the valve stem through-hole thereof; or a guide portion 29 to be fitted in the valve stem through-hole of the plate springs 19 may be provided on a packing flange 7a at a position around the valve stem through-hole thereof.

As described above, according to the second embodiment, since the arched plate springs 19 placed on the packing flange 7 are fastened from the upper side of the plate springs 19 by turning the hexagonal head nuts 18, the gland packing 6 can be fastened via the packing flange 7 with the high spring pressure of the arched plate springs 19, to keep the pressing force applied to the gland packing 6 for a long period of time. Further, the tilting of the gland packing 6 can be suppressed by provision of the arched plate springs 19 whose fastening stress is concentrated near the valve stem through-hole. Thus the packing flange 7 is not deflected sideways when the stud bolts 16 are screwed.

According to the second embodiment, by interposing the flat plate 26 between the plate springs 19 and the hexagonal head nuts 18 in place of the packing flange 7, the weight of the valve device can be reduced. The situation that when the hexagonal head nut 18 is screwed in, the bottom surface portion of the hexagonal head nut 18 is brought in contact with the end portion of the plate springs 19 and so obstruct the easy screwing of the hexagonal head nut 18 can be avoided.

According to the second embodiment, by replacing the through-holes each allowing the stud bolt 16 to pass therethrough with the cutout grooves 24 as represented by the plate springs 19b, 19c and 19e, the weight of the plate spring can be reduced.

According to the first embodiment, by forming the cutout groove for the valve stem 2 and the cutout grooves for the stud bolts 16 in such a manner that the former cutout groove and the latter cutout grooves are opened in the same direction as represented by the plate spring 19d, the plate spring 19d can be additionally stacked by only loosening the nut 18 without removing the nut 18. As a result, the spring force can be easily increased after assembly of the gland packing, thereby keeping up with a secular change in the pressing force of the gland packing 6 itself.

According to the second embodiment, by forming the plate spring into a shape capable of being fixed with both the ends engaged with portions of the hexagonal head nuts 18 as represented by the plate spring 19f, there can be obtained an effect of reducing the size and weight of the plate spring.

According to the second embodiment, the guide portion 28 is provided on the plate springs 19h at a position around the valve stem through-hole thereof in such a manner that the guide portion 28 is fitted in the valve stem through-hole of the packing flange 7 Alternatively the guide portion is provided on the packing flange 7a at a position around the valve stem through-hole thereof in such a manner that the guide portion is fitted in the valve stem through-hole of the plate springs 19. As a result, the situation can be avoided that when the hexagonal head nuts 18 are screwed in, the plate springs 19 are offset and brought in contact with the valve stem 2 and so obstruct the movement of the valve stem 2.

Embodiment 3

Figure 11A:
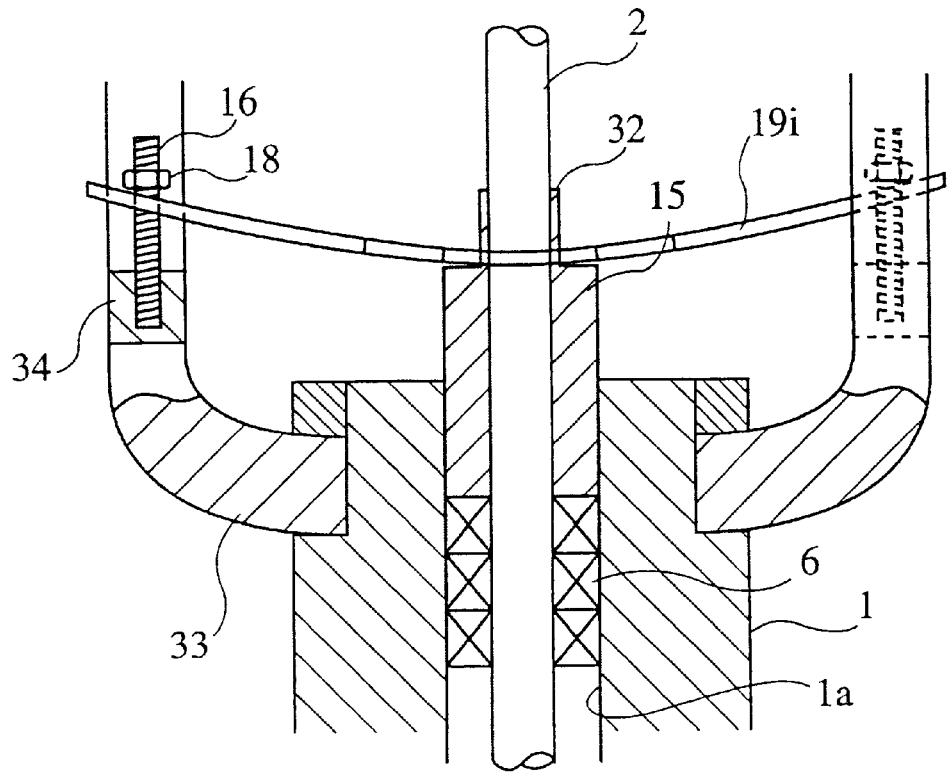
Figure 11B:
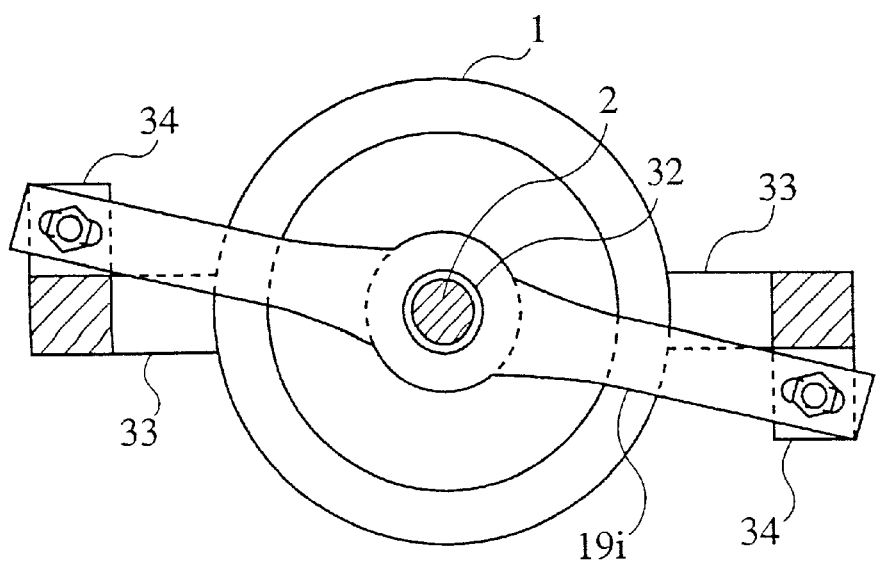
Figure 12:
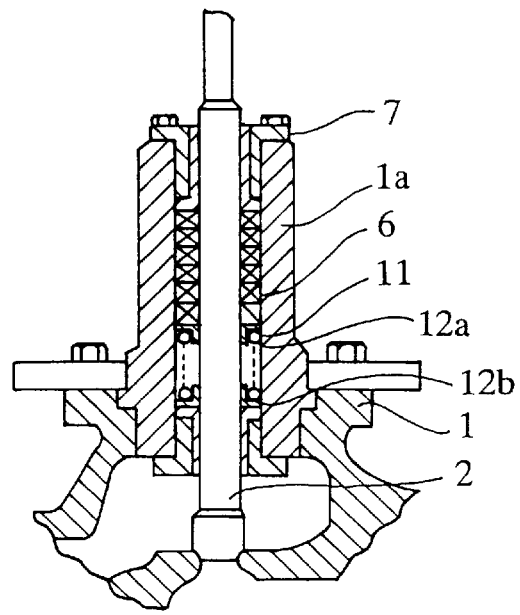
FIG. 12 is a vertical sectional view showing a prior art valve device of a coil spring type.
Figure 13:
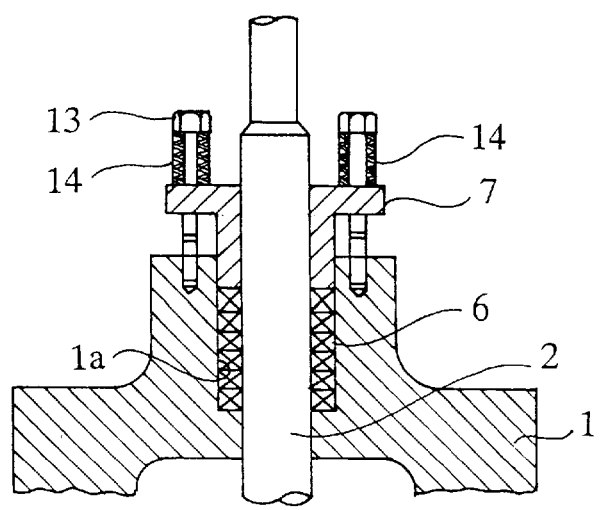
FIG. 13 is a vertical sectional view showing a prior art valve device of a conical disc spring type.

FIG. 11a is a sectional side view schematically showing a valve device according to a third embodiment of the present invention, and FIG. 11b is a top view of the valve device shown in FIG. 11a. In the figures, reference numeral 19i denotes a large-sized plate spring; 33 is a supporting portion formed by extending each side end of the upper lid 1; and 34 is a fixing portion for fixing the plate spring 19i by means of the stud bolt 16. It should be noted that the same or similar parts as or to those shown in FIG. 10 are denoted by the same reference numerals and the explanation thereof is omitted.

The valve device according to the third embodiment is characterized by allowing the use of the plate spring 19i longer than that used in the first or second embodiment by providing the supporting portions 33 on both the sides of the upper lid 1 as shown in FIGS. 11a and 11b. With this configuration, the plate spring 19i is allowed to transmit a pressing force larger than that of the plate spring used in the first or second embodiment to the gland packing 6, and further since the displacement of the plate spring 19i in the pressing direction becomes large, it is possible to sufficiently keep up with a secular change in pressing force of the gland packing 6 itself.

As described above, according to the third embodiment, by provision of the supporting portions 33 on both the sides of the upper lid 1, it is possible to use the plate spring 19i having a longer length and a larger radius of curvature as compared with the plate spring used in the first or second embodiment, and hence to transmit a larger pressing force to the gland packing 6. Further, since the displacement of the plate spring 19i in the pressing direction is large, a secular change in pressing force of the gland packing 6 itself can be coped with.

What is claimed is:

1. A valve device, comprising:

a packing container;

a valve stem vertically movably inserted in said packing container;

a gland packing interposed between said packing container and said valve stem;

a packing retainer disposed on said gland packing, said packing retainer having a valve stem through-hole formed therein and a curved surface formed in an upper end portion thereof;

a packing flange disposed on said packing retainer so as to contact said curved surface formed in said packing retainer, said packing flange having a valve stem through-hole and a plurality of bolt through-holes formed therein;

at least one arched plate spring disposed on a surface of said packing flange opposite said packing retainer, said plate spring extending generally across the length of said packing flange and having a valve stem through-hole and a plurality of bolt through-holes, said plate spring being arched away from said packing flange at its marginal ends when in an uncompressed state; and a plurality of bolt members, each extending through an associated one of said plurality of bolt through-holes formed in said packing flange and said at least one plate spring, for compressing said at least one plate spring into said packing flange to thereby press said packing retainer into said gland packing and press said gland packing against said packing container, wherein the arch of said plate spring causes a compressive force generated by said plate spring to be applied to said packing flange at a location generally adjacent to said valve stem extending through said valve stem through-hole of said packing flange to minimize tilting of said packing flange when said bolt members are tightened against said marginal ends.

2. A valve device according to claim 1, wherein said bolt through-holes of said plate spring comprise cutout grooves, each to be engaged with a portion of an associated one of said plurality of said bolt members, and said valve stem through-hole comprises a circular hole or a groove.

3. A valve device according to claim 1, wherein said bolt through-holes of said plate spring comprise cutout grooves, each being engaged with a portion of an associated one of said plurality of bolt members, and said valve stem through-hole comprises a groove opened in the same direction as the direction in which said cutout grooves are opened.

4. A valve device according to claim 1, wherein said plate spring is fixed with both end portions thereof engaged with portions of said bolt members.

5. A valve device according to claim 1, wherein said plate spring is bent in such a manner that portions, having said bolt through-holes, of said plate spring are flattened.

6. A valve device according to claim 1, wherein said plate spring has a guide portion to be fitted in said valve stem through-hole of said packing retainer, said guide portion being provided around said valve stem through-hole of said plate spring.

7. A valve device according to claim 1, wherein said packing retainer has a guide portion to be fitted in said valve stem through-hole of said plate spring, said guide portion being provided around a valve stem through-hole of said packing retainer.

\* \* \* \* \*